United States Patent
Qiang et al.

(10) Patent No.: US 11,981,969 B2
(45) Date of Patent: May 14, 2024

(54) LEATHER FINISHING AGENT AND PREPARATION METHOD THEREOF

(71) Applicant: Shaanxi University of Science & Technology, Xi'an (CN)

(72) Inventors: Taotao Qiang, Xi'an (CN); Linxin Guo, Xi'an (CN); Yangmin Ma, Xi'an (CN); Tingting Dai, Xi'an (CN)

(73) Assignee: Shaanxi University of Science & Technology, Xi'an (CN)

( * ) Notice: Subject to any disclaimer, the term of this patent is extended or adjusted under 35 U.S.C. 154(b) by 502 days.

(21) Appl. No.: 17/318,789

(22) Filed: May 12, 2021

(65) Prior Publication Data
US 2022/0064743 A1      Mar. 3, 2022

(30) Foreign Application Priority Data

Aug. 31, 2020   (CN) ................. 202010898803.9

(51) Int. Cl.
   *C14C 11/00*   (2006.01)
   *C09D 5/00*    (2006.01)
   *C09D 129/02*  (2006.01)

(52) U.S. Cl.
   CPC ............. *C14C 11/00* (2013.01); *C09D 5/00* (2013.01); *C09D 129/02* (2013.01)

(58) Field of Classification Search
   CPC .......... C14C 11/00; C09D 5/00; C09D 129/02
   See application file for complete search history.

(56) References Cited

U.S. PATENT DOCUMENTS 4,018,559 A * 4/1977 Retzsch ................. C14C 9/00
                                                    8/94.2

FOREIGN PATENT DOCUMENTS

| CN | 102993799 A | * | 3/2013 | |
| CN | 104846630 A |   | 8/2015 | |
| CN | 110016089 A | * | 7/2019 | ........... C08B 37/003 |
| CN | 110016089 A |   | 7/2019 | |
| CN | 110066565 A |   | 7/2019 | |
| CN | 110628315 A |   | 12/2019 | |

OTHER PUBLICATIONS

Office Action dated Jun. 11, 2021 for Chinese Patent Application No. 202010898803.9; 4 pgs.; The State Intellectual Property Office of the P.R.C., People's Republic of China.

* cited by examiner

*Primary Examiner* — Amina S Khan
(74) *Attorney, Agent, or Firm* — Andrew D. Fortney; Central California IP Group, P.C.

(57) ABSTRACT

A leather finishing agent that can enhance the mechanical properties and ultraviolet resistance of leather and a preparation method thereof are disclosed that relate to the field of leather additives. It was prepared by using polyphenol as raw material, hexamethylene tetramine as auxiliary agent, and a protonic acid as solvent, then heating and adding water for hydrolysis and dispersion. The method has the advantages of low production cost, simple process, high preparation efficiency, green production process and environmental protection. The leather finishing agent can be used in the finishing section after leather tanning. After finishing, the mechanical properties of the leather were significantly enhanced, and its UV resistance was also significantly improved.

10 Claims, 3 Drawing Sheets

LEATHER FINISHING AGENT AND PREPARATION METHOD THEREOF

TECHNICAL FIELD

The invention relates to the preparation field of leather additives, in particular to a leather finishing agent that can enhance the mechanical properties and ultraviolet resistance of leather and a preparation method thereof.

BACKGROUND

With the development of social economy, people's living standard has gradually improved. Leather products are popular with the public for their soft handle, natural appearance, strong wear resistance and aging resistance. In order to achieve these excellent properties of leather products, leather finishing agents play an important role. As a common leather additive, a leather finishing agent is mainly used for the protection of leather surface finishing and the beautification of leather. It is made up of film-forming materials, coloring materials, solvents and additives, etc., according to a certain proportion. Leather finishing agents are mainly used for leather modification. Through the firm combination of different raw materials and leather surface, it can improve the smoothness, gloss, oil and sweat resistance of leather. Leather finishing agents can effectively prolong the service life of leather products, increase the aesthetic degree of leather, significantly improve the quality and grade of leather products, and enhance the commercial value of leather.

CN 110628315A discloses a green environmental protection leather finishing agent and a preparation method thereof. The acetate fiber water-based polymer leather finishing agent therein has the advantages of green environmental protection, good stability, etc., and the finished leather has bright and beautiful appearance, acid and oil resistance, water resistance, dry and wet rubbing resistance, etc. CN 110066565A discloses a yellowing-resistant, high-adhesion leather finishing agent and a preparation method thereof. It uses a monomer containing a mussel adhesion protein functional unit (catechol group) to make a polyacrylate polymer, which can effectively improve the adhesion performance of the coating, and can effectively improve the yellowing resistance of leather by adding ultraviolet absorbent. CN 104846630A discloses an environment-friendly leather finishing agent, which can make leather have good ductility and folding resistance.

However, most of the leather finishing agents disclosed at present are single performance improvements for leather. In order to achieve the multi-performance improvement of leather finishing agents, it is necessary to add other functional chemical raw materials or include a multi-step reaction in the preparation process of the finishing agents. In this way, the preparation time of finishing agent becomes longer, the cost is greatly increased, and the preparation process may become more complex. Therefore, it is very meaningful to establish a one-step reaction method to prepare multifunctional leather finishing agent.

SUMMARY OF THE INVENTION

In order to overcome the disadvantages of the prior art, the invention aims to provide a leather finishing agent that can enhance the mechanical properties and ultraviolet resistance of leather and a preparation method thereof.

In order to achieve the above purpose, the invention adopts the following technical scheme to realize:

A method of preparing a leather finishing agent that can enhance the mechanical properties and anti-ultraviolet ability of leather. The leather finishing agent that can enhance the mechanical properties and anti-ultraviolet ability of leather is prepared by: heating a raw material comprising a polyphenol, an auxiliary agent comprising hexamethylene tetramine, and a solvent comprising a protonic acid to form a reaction mixture, hydrolyzing the reaction mixture, and dispersing the hydrolyzed reaction mixture with water to form the leather finishing agent.

The preparation method of the leather finishing agent that can enhance the mechanical properties and ultraviolet resistance of leather may include the following steps:

Mixing 5-15 parts by weight of the protonic acid and 1 part by weight of the polyphenol evenly to prepare a polyphenolic acid solution; mixing 1-5 parts by weight of the hexamethylenetetramine with the polyphenolic acid solution evenly to prepare a mixed solution; heating the mixed solution at 70-120° C. for 0.5-3 hours to obtain a reaction solution; and cooling the reaction solution to 25-60° C., then adding 10-20 parts by weight of water and hydrolyzing the cooled reaction solution for 0.5-1 hour to form the leather finishing agent that can enhance the mechanical properties and anti-ultraviolet ability of leather.

In some embodiments, the polyphenol is one or more of gallic acid, catechin and tannic acid.

In some embodiments, the protonic acid is one or more of formic acid, acetic acid, trifluoroacetic acid and polyphosphoric acid.

In some embodiments, the amounts by weight can be 1 part by weight of the polyphenol, 5-10 parts by weight of the protonic acid, 1-3 parts by weight of the hexamethylenetetramine and 10-15 parts by weight of water.

In a further embodiment, the mixed solution is heated at 80-100° C. for 1-2 hours.

In another further embodiment, the reaction solution is cooled to 30-50° C.

The invention also concerns a leather finishing agent that can enhance the mechanical properties and anti-ultraviolet ability of leather, prepared by the above preparation method.

Compared with the prior art, the invention has the following beneficial effects:

The invention is prepared using a protonic acid as solvent, heating, and adding water for hydrolysis and dispersion. In the preparation process of the leather finishing agent, a common polyphenol is used as raw material, the bulk chemical raw material hexamethylenetetramine is used as an auxiliary agent, and an active group is introduced into the polyphenol structure, which can produce a stable chemical bond with the amino group in the collagen fiber of leather, so as to improve the properties of the leather after finishing. In the preparation process, the protonic acid and reaction aids are added to the substrate, and the reaction is carried out at a higher temperature. After the reaction is complete, the temperature of the reaction solution is reduced, and water is added to hydrolyze some of the incomplete reaction intermediates. The preparation reaction of the leather finishing agent is prepared by a one-step method, with a short reaction time, low production cost, low production equipment requirements, a simple process and a high preparation reaction efficiency. At the same time, by adding water to hydrolyze the reaction system to prepare the leather finishing agent, the process has no discharge of three wastes (waste gas; waste water; industrial residue), and the preparation method is green and environmentally friendly. When the leather finishing agent was used in the finishing section after leather tanning, the mechanical properties and UV resistance of the finished leather were significantly improved.

Furthermore, after obtaining the reaction solution, the invention adopts the cooling hydrolysis treatment. The cooling hydrolysis process is to hydrolyze part of the incompletely reacted intermediate to obtain the final product. Because most of the intermediates can quickly complete the hydrolysis process in the early reaction process, the proportion of intermediates to be hydrolyzed in the prepared reaction solution is small, and the hydrolysis process is easy to carry out. Therefore, in order to avoid the energy consumption cost caused by long-time, high-temperature reaction and the risk of high-temperature destruction of the reaction substrate, the invention chooses to reduce the reaction temperature on the basis of complete conversion of the substrate, and then carry out hydrolysis.

BRIEF DESCRIPTION OF DRAWINGS

FIG. 1-2 is the comparison diagram of ultraviolet resistance of leather with and without the leather finishing agent in embodiment 1;

FIG. 2-1 is the comparison diagram of mechanical properties of leather with and without the leather finishing agent in embodiment 2;

FIG. 2-2 is the comparison diagram of anti-ultraviolet performance of leather with and without the leather finishing agent in embodiment 2;

FIG. 3-1 is the comparison diagram of mechanical properties of leather with and without the leather finishing agent in embodiment 3;

FIG. 3-2 is the comparison diagram of ultraviolet resistance of leather with and without the leather finishing agent in example 3;

DETAILED DESCRIPTION

In order to make the person having ordinary skill in the art better understand the scheme of the invention, the technical scheme of the invention will be described clearly and completely in combination with the drawings. Obviously, the described embodiments are only parts of the embodiments of the invention, not all the embodiments. Based on the embodiments of the invention, all other embodiments obtained by ordinary technicians in the art without making creative work shall belong to the protection scope of the invention.

It should be noted that the terms "including" and "having" and any variation of them in the description of the present invention are intended to cover the non-exclusive inclusion. For example, the process, method, system, product or device including a series of steps or units need not be limited to those steps or units clearly listed, but may include those not clearly listed or for these processes other steps or units inherent in the process, method, product or equipment.

The invention is further described in detail in combination with the attached drawings:

Example 1

A preparation method of leather finishing agent that can enhance the mechanical properties and anti-ultraviolet ability of leather, includes the following steps:

(1) 1 kg of gallic acid and 5 kg of acetic acid were added in the reactor to obtain a gallic acid solution;
(2) 1 kg hexamethylenetetramine, a reaction aid, was added to the gallic acid solution, and heated at 100° C. for 0.5 h to obtain a reaction solution;
(3) A leather finishing agent was prepared by: cooling the reaction solution to 50° C., adding 10 kg distilled water, and hydrolyzing the reaction solution for 0.5 h. Then the leather finishing agent was ready for use.

Figure 1:
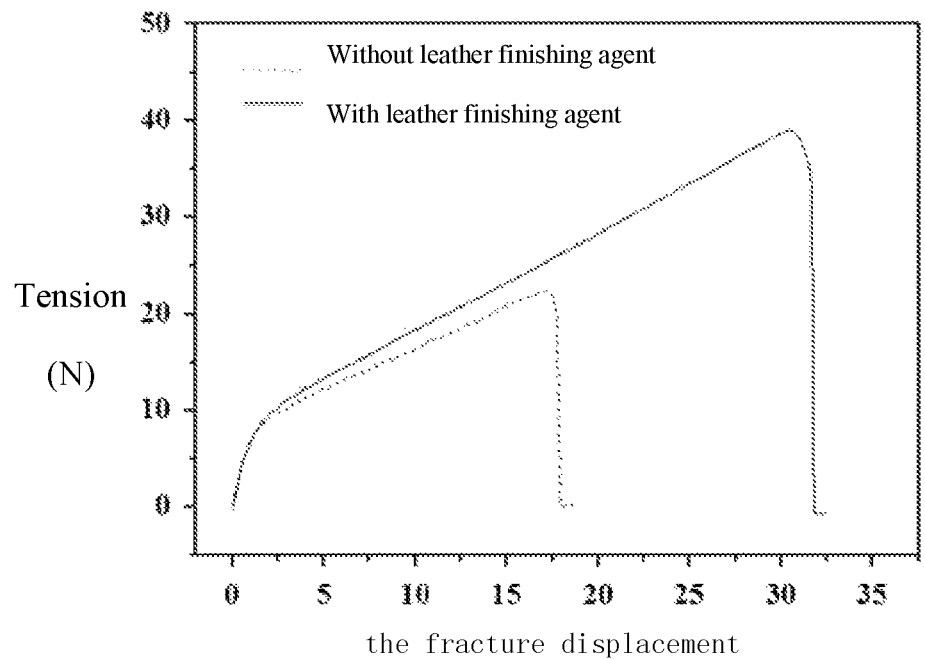
FIG. 1-1 is the comparison diagram of mechanical properties of leather with and without the leather finishing agent in example 1.

The leather finishing agent was used as the finishing section of tanned leather (taking condensed vegetable tanning leather as an example), and the properties of the finished leather were characterized: Using a 10 mm wide, 50 mm long coated leather test sample, a multi-functional tensile machine measured its mechanical properties. The experimental results are shown in FIG. 1-1. It can be seen from the figure that the leather fracture displacement increased from 17.5 mm to 30.8 mm, and in the process of fracture, the maximum force increased from 22.1N to 38.7N.

Figures 1, 2:
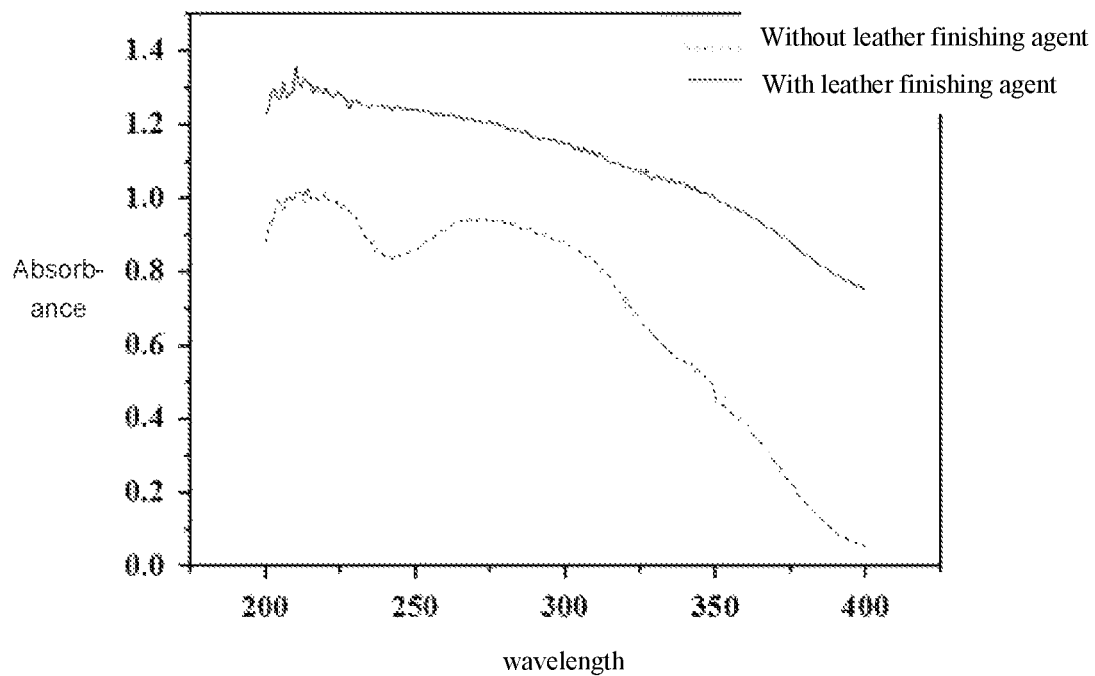
Figures 1, 2:
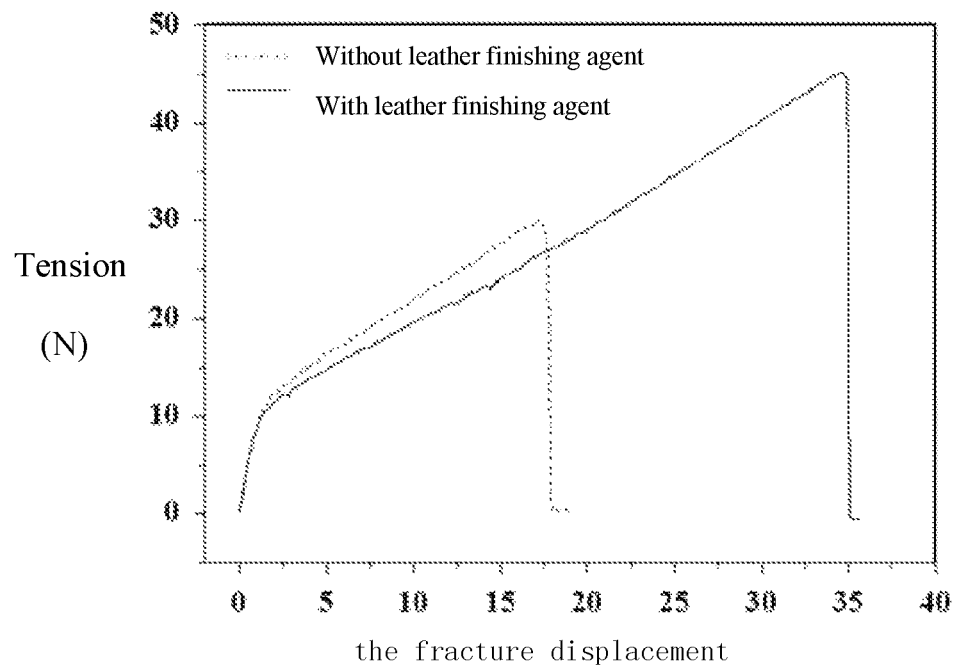
Figure 2:
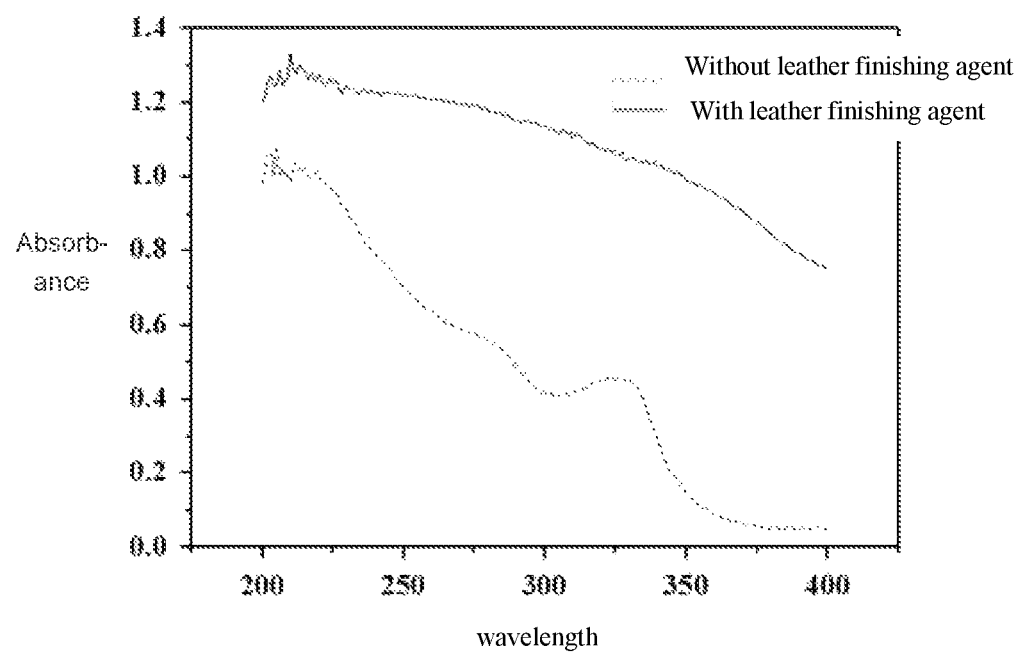

A UV spectrometer was used to measure the UV-resistance of the leather after finishing. The experimental results are shown in FIG. 1-2. It can be seen from the figure that the UV absorbance of leather samples added with the finishing agent is significantly enhanced in the range of UV wavelength (200 nm-400 nm). Therefore, the UV-resistance of leather can be significantly improved through the use of the leather finishing agent.

Example 2

A preparation method of leather finishing agent that can enhance the mechanical properties and anti-ultraviolet ability of leather, includes the following steps:

(1) 1 kg catechin and 8 kg trifluoroacetic acid were added into a reactor to obtain catechin acid solution;
(2) 2 kg hexamethylenetetramine was added to the catechin acid solution and heated at 90° C. for 1.5 h to obtain a reaction solution;
(3) A leather finishing agent was prepared by cooling the reaction solution to 40° C., adding 12 kg distilled water, and hydrolyzing the reaction solution for 0.5 h. Then the leather finishing agent was ready for use.

The leather finishing agent was used as the finishing section of tanned leather (taking chrome tanned leather as an example), and the properties of the finished leather were characterized. Using a 10 mm wide, 50 mm long coated leather test sample, the multi-functional tensile machine measured its mechanical properties. The experimental results are shown in FIG. 2-1. It can be seen from the figure that the leather fracture displacement increased from 16.3 mm to 35.1 mm, and in the process of fracture, the maximum force increased from 31.2N to 45.3N.

A UV spectrometer was used to measure the UV-resistance of the leather after finishing. The experimental results are shown in FIG. 2-2. It can be seen from the figure that the UV resistance of leather samples with the finishing agent is significantly enhanced in the range of UV wavelength (200 nm-400 nm). Therefore, the UV-resistance of leather can be significantly improved through the use of the leather finishing agent.

Example 3

A preparation method of leather finishing agent that can enhance the mechanical properties and anti-ultraviolet ability of leather, includes the following steps:

(1) 1 kg tannic acid and 10 kg polyphosphoric acid were added in a reactor to obtain a tannic acid solution;
(2) 3 kg hexamethylenetetramine was added to the tannic acid solution and heated at 80° C. for 2 h to obtain a reaction solution;
(3) After the reaction solution was cooled to 30° C., 20 kg distilled water was added, and the reaction solution was hydrolyzed for 1 h to obtain a leather finishing agent.

Figures 1, 3:
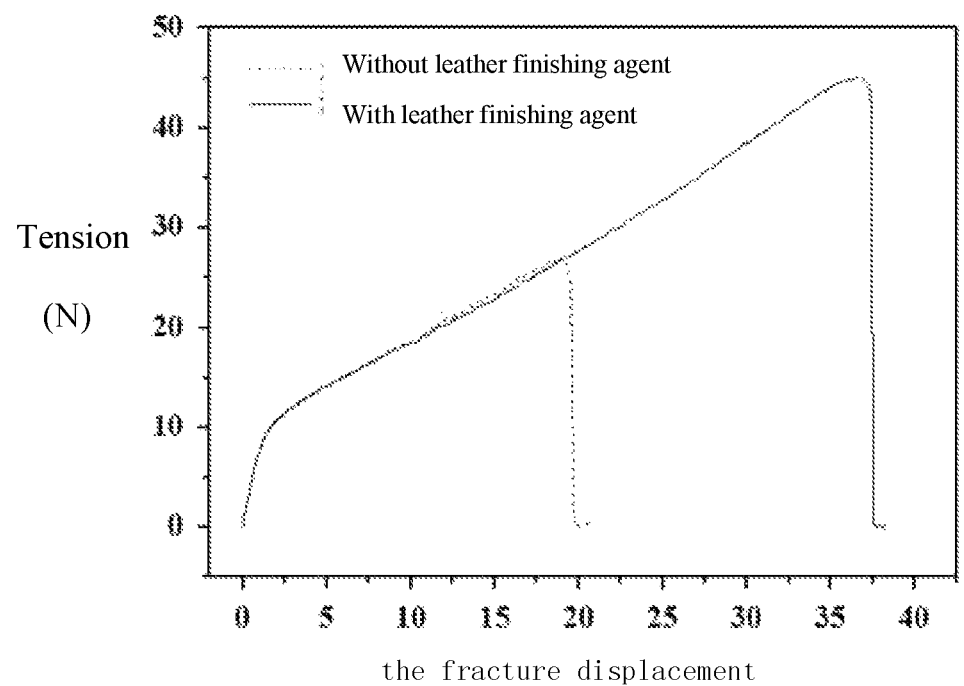
Figures 2, 3:
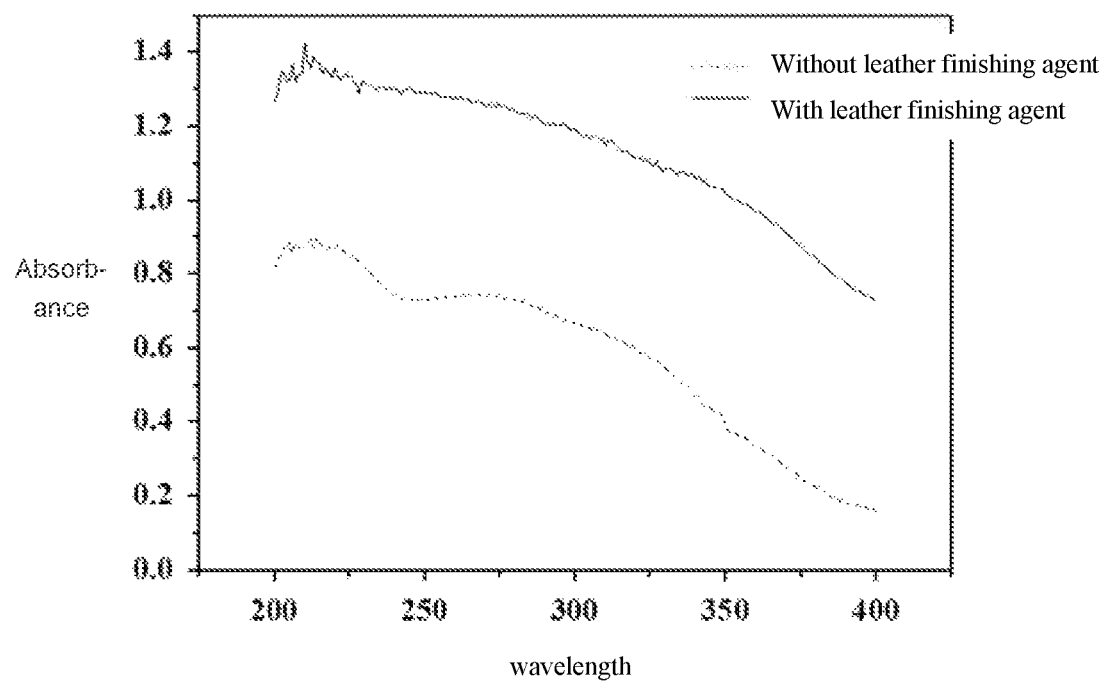

The leather finishing agent was used as the finishing section of tanned leather (taking hydrolyzed vegetable tanning leather as an example), and the properties of the finished leather were characterized. Using a 10 mm wide, 50 mm long coated leather test sample, the multi-functional machine measured its mechanical properties. The experimental results are shown in FIG. 3-1. It can be seen from the figure that the fracture displacement of the leather with this finishing agent increases from 19.2 mm to 37.1 mm, and the maximum force in the fracture process increases from 26.3N to 45.0N.

The UV-resistance of leather after finishing was determined by UV spectrometry. The experimental results are shown in FIG. 3-2. It can be seen from the figure that the UV absorbance of leather samples with the finishing agent is significantly enhanced in the range of UV wavelength (200 nm-400 nm). Therefore, the UV-resistance of leather can be significantly improved through the use of the leather finishing agent.

Example 4

A preparation method of leather finishing agent that can enhance the mechanical properties and anti-ultraviolet ability of leather, includes the following steps:
(1) A mixed acid solution was obtained by adding 0.5 kg gallic acid, 0.5 kg tannic acid and 15 kg acetic acid into a reactor;
(2) 5 kg hexamethylenetetramine was added to the mixed acid solution and heated at 120° C. for 3 h to obtain a reaction solution;
(3) A leather finishing agent was prepared by cooling the reaction solution to 60° C., adding 20 kg distilled water, and hydrolyzing the reaction solution for 1 h.

Example 5

A preparation method of leather finishing agent that can enhance the mechanical properties and anti-ultraviolet ability of leather, includes the following steps:
(1) 1 kg catechin, 5 kg acetic acid and 5 kg trifluoroacetic acid were added to the reactor to obtain a catechin acid solution;
(2) 1 kg hexamethylenetetramine was added to the catechin acid solution, which was heated at 70° C. for 0.5 h to obtain a reaction solution;
(3) After the reaction solution was cooled to 25° C., 10 kg distilled water was added in it which was hydrolyzed for 1 h to prepare a leather finishing agent.

The above content is only to illustrate the technical idea of the invention, and cannot limit the protection scope of the invention. Any changes made on the basis of the technical solution according to the technical idea of the invention fall into the protection scope of the claims of the invention.

What is claimed is:

1. A method of preparing a leather finishing agent comprising:
heating a raw material comprising a polyphenol, an auxiliary agent comprising hexamethylene tetramine, and a solvent comprising a protonic acid to form a reaction mixture,
hydrolyzing the reaction mixture, and
dispersing the hydrolyzed reaction mixture with water to form the leather finishing agent.

2. The method according to claim 1, comprising:
mixing 5-15 parts by weight of the protonic acid and 1 part by weight of the polyphenol evenly to prepare a polyphenolic acid solution;
mixing 1-5 parts by weight of the hexamethylene tetramine with the polyphenolic acid solution evenly to prepare a mixed solution;
heating the mixed solution at 70-120° C. for 0.5-3 hours to obtain a reaction solution;
cooling the reaction solution to 25-60° C., then adding 10-20 parts by weight of water and hydrolyzing the cooled reaction solution for 0.5-1 hour to form the leather finishing agent.

3. The method according to claim 1, wherein the polyphenol is one or more of gallic acid, catechin and tannic acid.

4. The method according to claim 1, wherein the protonic acid is one or more of formic acid, acetic acid, trifluoroacetic acid and polyphosphoric acid.

5. The method according to claim 2, wherein 5-10 parts by weight of the protonic acid are mixed with 1 part by weight of the polyphenol, 1-3 parts by weight of the hexamethylenetetramine are mixed with the polyphenolic acid solution, and 10-15 parts of the water are added to the cooled reaction solution.

6. The method according to claim 2, wherein the mixed solution is heated at 80-100° C. for 1-2 hours.

7. The method according to claim 2, wherein the reaction solution is cooled to 30-50° C.

8. The method according to claim 1, wherein the leather finishing agent enhances mechanical and anti-ultraviolet properties of a leather.

9. A leather finishing agent, prepared by the method according to claim 1.

10. The leather finishing agent according to claim 9, wherein the leather finishing agent enhances mechanical and anti-ultraviolet properties of a leather.

* * * * *